US009612942B2

(12) United States Patent
Citron et al.

(10) Patent No.: US 9,612,942 B2
(45) Date of Patent: Apr. 4, 2017

(54) VERIFICATION OF A COMPUTER PROGRAM IN RESPECT TO AN UNEXPECTED RESPONSE TO AN ACCESS REQUEST

(75) Inventors: Daniel Citron, Haifa (IL); Yarden Nir-Buchbinder, Haifa (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 1067 days.

(21) Appl. No.: 12/948,788

(22) Filed: Nov. 18, 2010

(65) Prior Publication Data
US 2012/0130702 A1    May 24, 2012

(51) Int. Cl.
G06F 9/45 (2006.01)
G06F 11/36 (2006.01)

(52) U.S. Cl.
CPC ............... G06F 11/3672 (2013.01)

(58) Field of Classification Search
CPC .................................. G06F 11/3672
USPC .......................................... 703/22
See application file for complete search history.

(56) References Cited

U.S. PATENT DOCUMENTS

| | | | | |
|---|---|---|---|---|
| 5,974,569 A * | 10/1999 | Nickles | ............... | G06F 11/3688 714/33 |
| 7,092,866 B2 * | 8/2006 | Rokosz | ............................ | 703/17 |
| 7,475,002 B1 | 1/2009 | Mann | | |
| 2003/0212989 A1 | 11/2003 | Rokosz | | |
| 2005/0120276 A1 * | 6/2005 | Kolawa et al. | .................. | 714/38 |
| 2007/0100596 A1 * | 5/2007 | Hollis | .............................. | 703/14 |
| 2008/0270819 A1 * | 10/2008 | Hamilton | ....................... | 713/502 |
| 2010/0125836 A1 * | 5/2010 | Sazegari et al. | .............. | 717/151 |
| 2010/0250225 A1 * | 9/2010 | Gray-Donald et al. | ......... | 703/17 |
| 2012/0054551 A1 * | 3/2012 | Gao et al. | ..................... | 714/38.1 |

OTHER PUBLICATIONS

"SoftBase," 2009, downloaded from the Wayback Machine dated Dec. 17, 2009, two pages.*
"IBM Application Time Facility for z/OS, User's Guide," 2007, International Business Machines, pp. 1-68.*

(Continued)

Primary Examiner — Kamini S Shah
Assistant Examiner — Russ Guill
(74) Attorney, Agent, or Firm — Ziv Glazberg

(57) ABSTRACT

Testing a computer program comprises identification of resource access requests by the computer program to a resource provided by an underlying host. The resource access requests may be intercepted and a determined response may be returned instead of the actual response of the underlying host. In some exemplary embodiments, the resource may a clock of the underlying host and the response may be the time of the clock. In some exemplary embodiments, the computer program may be tested to check for validity during execution on a cloud computing environment, in which access to resources may yield results that on a non-cloud computing environments are generally not expectable. The testing may be performed on a non-cloud computing environments and simulate scenarios applicable to cloud computing environments.

14 Claims, 5 Drawing Sheets

(56) References Cited

OTHER PUBLICATIONS

Takayuki Bonzai et al., "D-cloud: design of a software testing environment for reliable distributed systems using cloud computing technology," May 17, 2010, 2010 10th IEEE/ACM International Conference on Cluster, Cloud and Grid Computing, pp. 631-636.*
Hong Ong et al., "VCCP: A Transparent, Coordinated Checkpointing System for Virtualization-based Cluster Computing," 2009, IEEE International Conference on Cluster Computing and Workshops, ten pages.*
"Time Machine" datasheet, 2008, SolutionSoft Systems, two pages.*
"Time Machine" home web page from the Wayback Machine, 2008, Solution-Soft, three pages.*
Ian Lucas, "Testing times in computer validation," 2003, Journal of Validation Technology, vol. 9, No. 2, pp. 153-161.*
Optionistic, "Random Time Generator," 2008, downloaded from http://www.excelforum.com/excel-formulas-and-functions/662470-random-time-generator.html on Jun. 27, 2015, three pages.*
Gerard, "Random Clock Time Generator," Jun. 10, 2007, downloaded from http://presurfer.blogspot.com/2007/06/random-clock-time-generator.html on Jun. 27, 2015, four pages.*
RichH, "Faking Time Without Changing Windows System Clock," Jan. 13, 2009, http://stackoverflow.com/questions/437599/faking-time-without-changing-windows-system-clock, 2 pages.*
Moez Krichen et al., "Conformance testing for real-time systems," Feb. 14, 2009, Formal Methods in System Design, vol. 34, pp. 238-304.*
Tom, "High-performance Timing on Linux/Windows," Jun. 27, 2010, tdistler.com/2010/06/27/high-performance-timing-on-linux-windows, 8 pages.*
"Year 2000 Computing Crisis: An Assessment Guide," 1997, United States General Accounting Office, pp. 1-34.*
Voretaq7, "what is the easiest way to test the impact of NTP step changes on other software," Jul. 15, 2010, http://serverfault.com/questions/160724/what-is-the-easiest-way-to-test-the-impact-of-ntp-step-changes-on-other-software, two pages.*
Brian Luzum, "The pros and cons of leap seconds," 2006, Physics Today, Nov. 2006, 2 pages.*
"Time Machine", URL: www.solution-soft.com.

* cited by examiner

VERIFICATION OF A COMPUTER PROGRAM IN RESPECT TO AN UNEXPECTED RESPONSE TO AN ACCESS REQUEST

BACKGROUND

The present disclosure relates to verification of a computer program in general, and to testing of a computer program that may migrate from a first host to a second host during the operation of the computer program, in particular.

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

A computer program may be operated by a host, such as a computer server. Today, cloud computing is a well established and utilized computing paradigm. In cloud computing, the computer program may be executed by a "cloud" of processing devices, such as a network of servers and similar computing machines. During execution of a computer program by a cloud, the computer program may migrate from a first host to a second host. For example, the computer program may be executed by a virtual machine. The virtual machine may be first processed by a first server, and later on the virtual machine may be migrated to a second sever to continue execution of the computer program. The servers and other computing machines are deemed as hosts. The hosts may be responsible to provide resources to the virtual machine, and therefore to the computer program. The resources may be, for example, free memory, shared memory, storage space, access to pseudo-random generator, access to a clock, or the like.

SUMMARY

One exemplary embodiment of the disclosed subject matter is a computer-implemented method, the method comprising: testing a computer program by operating the computer program by a computerized device, wherein the computerized device is operative to provide the computer program with access to a resource; intercepting an access request to the resource by the computer program, wherein the intercepting comprises: determining a response to be provided to the computer program; and providing the determined response to the computer program instead of a response from the resource to the request.

Another exemplary embodiment of the disclosed subject matter is a computerized apparatus having a processor, the apparatus comprising: a testing module operative to operate a computer program, wherein the testing module is configured to provide the computer program with access to a resource; an interceptor operative to intercept an access request to the resource by the computer program, wherein the interceptor comprises a response determinator operative to determine a response to be provided to the computer program, and wherein the interceptor is further operative to provide the determined response to the computer program instead of a response from the resource to the request.

Yet another exemplary embodiment of the disclosed subject matter is a computer program product, the product comprising: a computer readable medium; a first program instruction for testing a computer program by operating the computer program by a computerized device, wherein the computerized device is operative to provide the computer program with access to a resource; a second program instruction for intercepting an access request to the resource by the computer program, wherein the second program instruction comprises: a third program instruction for determining a response to be provided to the computer program; and a fourth program instruction for providing the determined response to the computer program instead of a response from the resource to the request; wherein the first, second, third, and fourth program instructions are stored on the computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
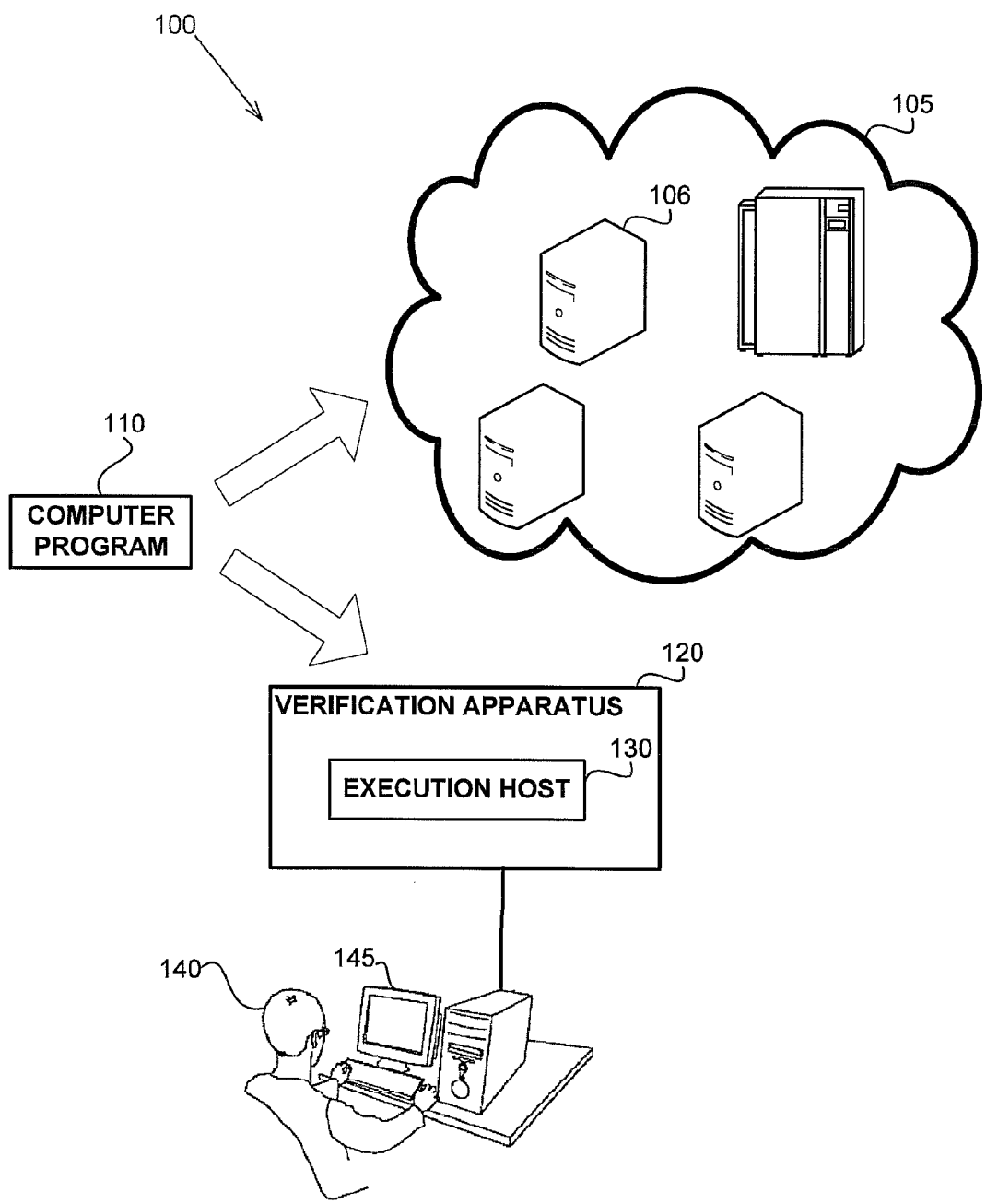
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to test a computer program when operated by a cloud. Another technical problem is to test whether migration between hosts may invalidate operation of a computer program. Yet another technical problem is to test the computer program in respect to cloud processing schema by executing the computer program on a single host or by another non-cloud processing system. Yet another technical problem is to test the computer program in respect to possible migration that is not specifically related to a cloud computing environment.

One technical solution is to simulate resource responses from a host to requests by the computer program. The simulated responses may be configured to simulate responses that may occur in case migration occurs. Another technical solution is to intercept resource requests and provide alternative simulated responses. Yet another technical solution is to intercept time requests directed to a clock of the host, and to simulate alternative responses. Yet another technical solution is to simulate an alternative response by randomly choosing a response within a predetermined range of a previously provided response. For example, in case a time of 06:32:16 was previously provided, the simulated response may be a random time that is within a range of one minute from the previously provided time (i.e., a time between 06:31:16 and 06:33:16).

One technical effect of utilizing the disclosed subject matter is to simulate the technical effect of migration without having to perform an actual migration during the testing phase. The testing environment may be a relatively simple processing environment, and need not be a cloud processing environment. Another technical effect is to simulate resource responses that are unexpected in a single-host environment, but may occur in a cloud processing environment. For example, as time is a monotonically strictly increasing function, a first provided time must be earlier than a second provided time that is provided afterwards. However, in a cloud computing environment, as the first time may be provided based on a first clock and the second time may be provided based on a second clock, this inherent feature of the provided time may be violated. The disclosed subject matter provides a technical effect of simulating such a scenario when executing the computer program by a single host. Yet another technical effect is to simulate execution of the computer program in which returned times are not represented by a monotonically strictly increasing function. Yet another technical effect is to test operation of the computer program in respect to a clock skipping forward. In some exemplary embodiments, due to the clock skipping forward, time out operations may be invoked and sensitivity of the computer program to time out values may be tested.

Referring now to FIG. 1 showing a computerized environment in which the disclosed subject matter is used, in accordance with some exemplary embodiments of the subject matter.

A computerized environment 100 may comprise a computer program 110. The computer program 110 may be a set of instructions operative to operate a processing machine, such as a processor, also referred to as a host. The computer program 110 may be embedded on a computer-readable medium. The computer program 110 may be operated by a cloud 105. The cloud 105 may comprise a plurality of hosts, such as host 106. The hosts of the cloud 105 may be connected in a computer network, such as a LAN, a WAN, a WiFi, a WiMax, the Internet, an intranet, combination thereof, or other communication network. In some exemplary embodiments, the computer program 110 may be indifferent of the specific implementation details of the cloud 105. For example, the computer program 110 may not be indifferent to the number of hosts of the cloud 105, the type of hardware used thereof, the manner in which hosts are connected, or the like. In some exemplary embodiments, the computer program 110 may be executed using a Virtual Machine (VM) (not shown). The VM may be used to abstract implementation details from the computer program 110. The VM may be capable of being executed by the cloud 105. During execution of the computer program 110, the cloud may migrate the VM from one host to another. The computer program 110 may be unaware of such an event occurring. In some exemplary embodiments, migration may occur also in an exemplary embodiment in which a VM is not used.

In some exemplary embodiments, migration may comprise taking a snapshot of the memory allocated for the VM, setting memory of another host with the snapshot and freeing the allocated memory. As the memory retains current state of the computer program 110, copying it may be considered as moving the computer program 110 from one host to another. It will be noted, that additional operations may be required, such as setting Operating System (OS) entities in a specific state (e.g., file handlers, semaphores, or the like). A person of ordinary skill in the art is capable of enabling migration of a computer program 110 (either with or without a virtual machine) from one host in a cloud to another host in the cloud.

It will be noted that migration may also occur in a non-cloud computing environment. For example, a snapshot of the program may be taken and used later on to resume the computer program in the same machine after reboot. As another example, the snapshot may be used to resume operation of the computer program on another machine (which need not, necessarily, be a part of a cloud).

In some exemplary embodiments, a verification apparatus 120 may be configured to test execution of the computer program 110. The verification apparatus 120 may be configured to execute tests of the computer program 110, such as retained in a testing benchmark. A test may define stimulus events to the computer program 110 such as input from a user, input from environment executing the computer program 110 or the like. The verification apparatus 120 may comprise an execution host 130 providing computation capabilities and/or other resources to the executed computer program 110. In some exemplary embodiments, the execution host 130 may be a single host, such as 106. In other exemplary embodiments, the execution host 130 may be a cloud, such as 105. For the purpose of the disclosed subject matter, implementation details of the execution host 130 are generally of no particular importance.

In some exemplary embodiments, a user 140 may interact with the verification apparatus 120 using a Man-Machine Interface (MMI) 145 such as a terminal, a display, a keyboard, an input device or the like. The user 140 may define the test to be used in respect to the computer program 110. The user 140 may provide rules, commands, preferences, and parameters to the verification apparatus 120. The user 140 may view output of the verification apparatus 120. Based upon the output, the user 140 may determine to design a new test, to modify the test (or a test template utilized to generate of the test, in case of a generation-based test), or the like. The user 140 may further identify bugs, report the identified bugs and/or correct the identified bugs.

Figure 2:
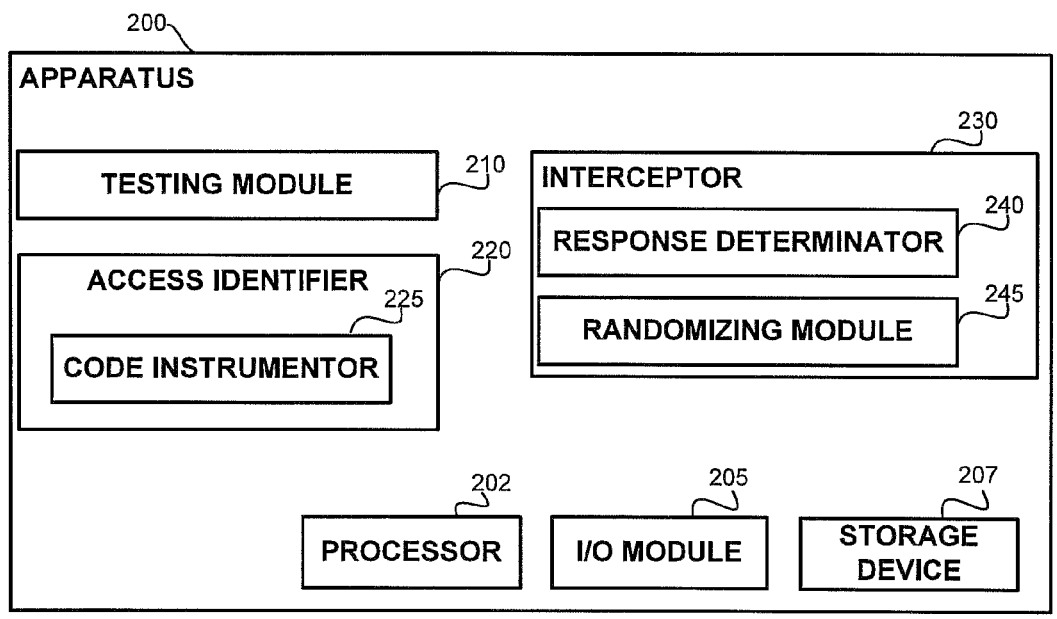
FIG. 2 shows a block diagram of an apparatus, in accordance with some exemplary embodiments of the disclosed subject matter.

Referring now to FIG. 2 showing an apparatus in accordance with some exemplary embodiments of the disclosed subject matter. An apparatus 200, such as 120 of FIG. 1, may be configured to test the functional operation of a computer program, such as 110 of FIG. 1.

In some exemplary embodiments, a testing module 210 may be configured to operate a computer program, such as 110 of FIG. 1. The testing module 210 may be configured to facilitate testing of the computer program by executing the program. In some exemplary embodiments, the test program is configured to access a resource of a host executing the computer program. Some exemplary resources may be performance statistics (e.g., free memory space, number of processes being executed, CPU usage, or the like), memory locations of memory associated with the host, a clock, or the like. In some exemplary embodiments, the testing module 210 is operative to test operation of the computer program, when executed in a cloud processing environment.

In some exemplary embodiments, the testing module 210 may be operative to execute the test program on a host (or a plurality of hosts) and provide the host with appropriate stimuli associated with testing the computer program. A non-exhaustive list of stimuli may include: input to be provided to the computer program, scheduling of concurrent entities such as threads, or the like.

In some exemplary embodiments, an access identifier 220 may be configured to identify an access request to the resource by the computer program. The access identifier 220 may identify an access by adding a hook to a resource request, such as for example, hooking up to a system call request. In some exemplary embodiments, the access identifier 220 may identify the access by reviewing the program code of the computer program and identifying invocation of pertinent function calls. In some exemplary embodiments, the access identifier 220 may be configured to pre-process the computer program prior to execution thereof by the testing module 210. During the pre-processing, function calls operative to access the resource may be identified and invocation thereof during execution may be used to identify access requests.

In some exemplary embodiments, a code instrumentor 225 may be utilized to instrument code operative to be invoked in connection with invocation of the function. For example, code may be instrumented in the beginning of the function. As another example, a macro definition (e.g., #define command in C language) may be used to replace the function call with invocation of the instrumented code. In some exemplary embodiments, instrumentation may be performed in respect to a binary representation of the computer program, such as in the case the source code is not available (i.e., testing of a "black box"). The binary may be instrumented in portions that are associated with performing an access request, such as for example invocation of system calls, an Application Programming Interface (API) or the like. A person of ordinary skill in the art is able to enable identification by the access identifier 220 in additional and alternative manners.

In some exemplary embodiments, invoking a function operative to access the clock and return time, such as a function of the C Time library, may be identified by the access identifier 220. In some exemplary embodiments, the code instrumentor 225 may be operative to replace function calls to the function with alternative functions, such as associated with an interceptor 230, as is further described hereinbelow.

In some exemplary embodiments, an interceptor 230 may be operative to intercept the access request, such as identified by the access identifier 220, and provide a determined response thereof. The response may be determined by a response determinator 240. Interception of the access request may be performed using instrumented code, instrumented by the code instrumentor 225. The interceptor 230 may be operative to provide the response with or without access the resource of an executing host. For example, in case of access request to the clock of the machine, a time may be returned with or without accessing the clock itself. The determined response may be a time that is different than the time that the clock would return.

In some exemplary embodiments, a response determinator 240 may be configured to determine the response to the access request. In some exemplary embodiments, the response determinator 240 may determine a random response. In some exemplary embodiments, the response determinator 240 may determine a response based on previously provided responses. In some exemplary embodiments, the response determinator 240 may be operative to retain provided responses and utilize them for future responses determination. In some exemplary embodiments, a previously provided response may be used as a reference value and the determined response may be a value that is within a predetermined range of the reference value. The range may be determined by a user, such as 140 of Figure, and optionally provided to the apparatus 200 using an input module, such as 205. The range may be affected by various additional factors. As an example, consider a resource of "clock", which provides a response of "time". The determined time may be based on a previously provided time as a reference point. The determined time may be within a range of two minutes from the previous response. In one exemplary embodiment, the range may be affected by the time that has passed since the previous response. In some exemplary embodiments, some determined responses, such as for example a first response, may be determined by accessing the actual resource (e.g., the clock of the host machine).

In some exemplary embodiments, the response determinator 240 may be operative to provide a time that is before a previously provided time. Such a response is generally not a valid response in a non-cloud computing environment as time is a monotonically strictly increasing function. However, such as response may occur in a cloud computing environment, as a first response may be provided by a first clock of a first host whereas a second response may be provided by a second clock of a second host.

In some exemplary embodiments, the response determinator 240 may be operative to provide a time such that the time difference between the time and a previously provided time is longer than actual time difference between providing the previously provided time and the time. In such a manner, skipping forward of the clock may be simulated. Alternatively, this may be used to simulate some aspects of slow performance of operation by a computer executing the computer program. In some exemplary embodiments, the computer program may be responsive to time out values, and the provided time may be used to test operation of the computer program when time out values are reached. In some exemplary embodiments, the computer program may inherently assume approximated timings of operations. For example, a sleep command may be invoked for a predetermined amount of time, as the programmer of the computer program assumed that during the predetermined amount of time, some concurrent operation would be completed.

In some exemplary embodiments, the response determinator 240 may access the clock to determine current time. The determined time may be a time after at least a predetermined time duration from the current time. For example, in case the current time is 09:10:20, and the predetermined time duration is one minute, the determined time may be 09:11:22, 09:20:00, 10:00:00, 23:00:00 or the like. In some exemplary embodiments, a maximum shift in time may be predetermined in addition to or instead of minimal shift in time. For example, the time may be shifted by a minimal shift of two minutes and a maximal shift of ten minutes. In some exemplary embodiments, the apparatus 200 may be configured to provide the current time in response to a first request and a time in accordance with the present paragraph in response to a consecutive request, hence providing for a simulation of having a speedy clock. The speedy clock may be substantially fast-paced (e.g., every second the speedy clock skips ten seconds). In some exemplary embodiments, the responses provide for a simulation of execution of the computer program by a slow or fast processing device, as reported time lapses between two consecutive time requests are reported to be longer/shorter than in actuality. In other words, the number of instructions performed in actuality during a time period is reported to being performed in a shorter/longer time period.

In some exemplary embodiments, a randomizing module 245 may be utilized to determine a response in a random or pseudo-random manner. The randomizing module 245 may be utilized to determine a response within a predetermined range of a reference value.

In some exemplary embodiments, the apparatus 200 may comprise a processor 202. The processor 202 may be a Central Processing Unit (CPU), a microprocessor, an electronic circuit, an Integrated Circuit (IC) or the like. The processor 202 may be utilized to perform computations required by the apparatus 200 or any of it subcomponents.

In some exemplary embodiments of the disclosed subject matter, the apparatus 200 may comprise an Input/Output (I/O) module 205. The I/O module 205 may be utilized to provide an output to and receive input from a user, such as 140 of FIG. 1.

In some exemplary embodiments, the apparatus 200 may comprise a storage device 207. The storage device 207 may be a hard disk drive, a Flash disk, a Random Access Memory (ROM), a memory chip, or the like. In some exemplary embodiments, the storage device 207 may retain program code operative to cause the processor 202 to perform acts associated with any of the subcomponents of the apparatus 200. In some exemplary embodiments, the storage device 207 may retain a previously provided response.

Figure 3:
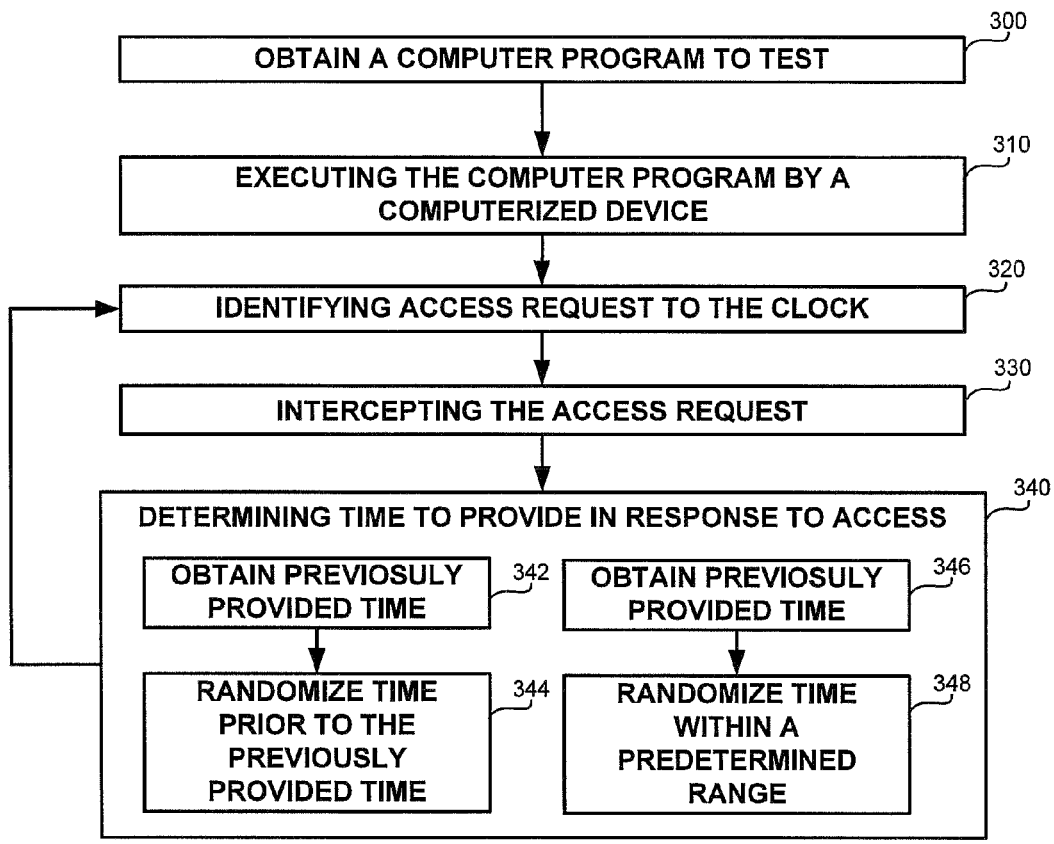
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter. Although FIG. 3 specifically refers to an example in which an accessed resource is a clock which returns time, the disclosed subject matter is not limited to this example.

In step 300, a computer program to test may be obtained. A binary representation of the computer program may be obtained. A source code representation may be obtained. The computer program may be obtained by an Input module, such as 205 of FIG. 2.

In step 310, the computer program may be executed by a computerized device. The computer program may be executed for the purpose of testing its operation. The computer program may be executed and tested by a testing module, such as 210 of FIG. 2.

In step 320, an access request to the clock may be identified. Identification may be performed by an access identifier, such as 220 of FIG. 2. In some exemplary embodiments, identification may be enabled by pre-processing the computer program, by instrumenting the computer program prior to its execution with pertinent code, or the like.

In step 330, the access request may be intercepted. In some exemplary embodiments, the access request may be intercepted and the clock may or may not be accessed. In some exemplary embodiments, the access request may be intercepted by executing code instrumented by a code instrumentor, such as 225 of FIG. 2. The interception may be performed by an interceptor, such as 230 of FIG. 2.

In step 340, a time to be provided in response to the access may be determined. The time may be determined by a response determinator, such as 240 of FIG. 2. The time may be provided to the computer program. After determining and provided the determined time is performed, additional access requests may be identified and responded to in accordance with the disclosed subject matter.

In some exemplary embodiments, determining the time to provide comprises steps 342 and 344.

In step 342, a previously provided time may be obtained. The time may be obtained from a storage device, such as 207 of FIG. 2.

In step 344, a time that is prior to the previously provided time may be randomly determined. The determination may be performed using a randomizing module, such as 245 of FIG. 2. The determined time may be earlier than previously provided time and therefore may invalidate an assumption that returned time is a monotonically strictly increasing function, assumption that may not be correct in a cloud-computing environment. The determined time may determined as to provide a longer time difference between the time and the previously provided time, than the time that has actually passed between providing of the two time values.

In some exemplary embodiments, determining the time to provide comprises steps 346 and 348.

In step 346, a previously provided time may be obtain, in a similar manner to that of step 342.

In step 348, a random time within a predetermined range of the previously provided time may be determined. The random time may be determined using a randomizing module, such as 245 of FIG. 2. The predetermined range may be a range determined by a user, such as 140 of FIG. 1.

In some exemplary embodiments, after sufficient testing of the computer program is performed (e.g., based on coverage metrics, determination by the QA staff member, or the like) the computer program may be deemed as "safe" to be loaded onto the cloud to be operated thereon. In some exemplary embodiments, an administrative authority of the cloud may prohibit loading of a computer program that has not sufficiently been tested. The disclosed subject matter may be used as the sole test or an additional test to be performed prior to loading of the computer program onto the cloud.

The following example is provided for clarity of disclosure only, and should not be construed to limit the scope of the disclosed subject matter. Consider a code snippet:

time1=gettime( )
time2=gettime( )
timersub(time1, time2, &diff);
assert(diff.tv_sec>=0);

where timersub is a function that is operative to determine a time difference between "time1" and "time2", by subtracting "time1" from "time2" and assign the time difference into "diff". This code snippet, when testing in a non-cloud computing environment is stable, as "time1" is set based on a clock reading that is performed prior to a clock reading associated with setting "time2". However, in a cloud computing environment, "time1" may comprise a time after to "time2" and therefore the assertion may fail. The disclosed subject matter may be utilized to test this code snippet and determine that in some scenarios in a cloud computing environment, "time2" may be a time prior to "time1" even though it is set afterwards.

The disclosed subject matter may be utilized to test the computer program comprising this code snippet by executing the computer program, identifying access requests to a resource (e.g., calling of the function "gettime"), intercepting the access requests and determining a response to be provided in return.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the following definitions are disclosed to provide for a complete understanding of the cloud computing environment. The definitions have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
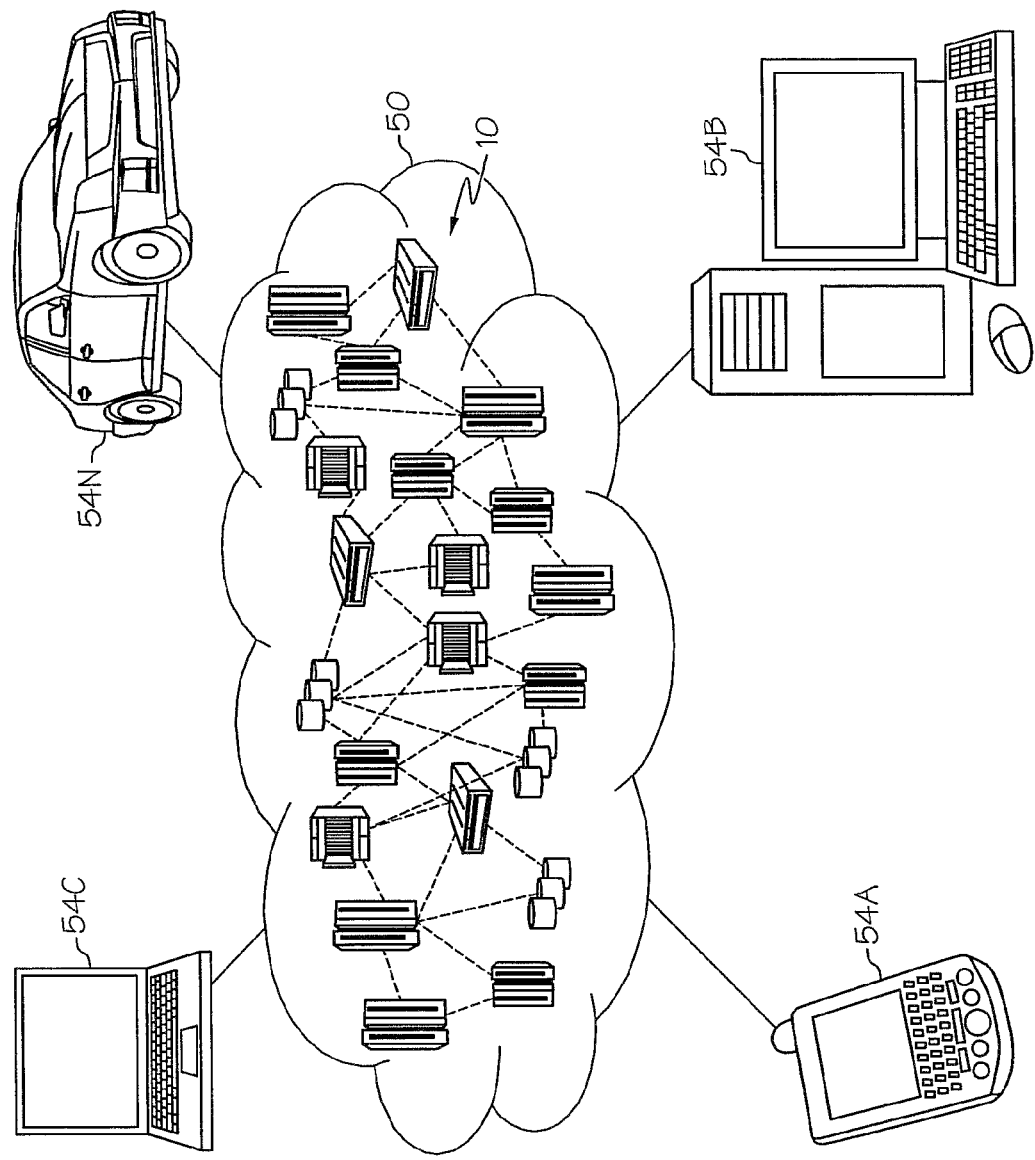
FIG. 4 depicts a cloud computing environment, in accordance with some exemplary embodiments of the disclosed subject matter.

Referring now to FIG. 4 illustrative cloud computing environment 50, such as 105 of FIG. 1, is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 5:
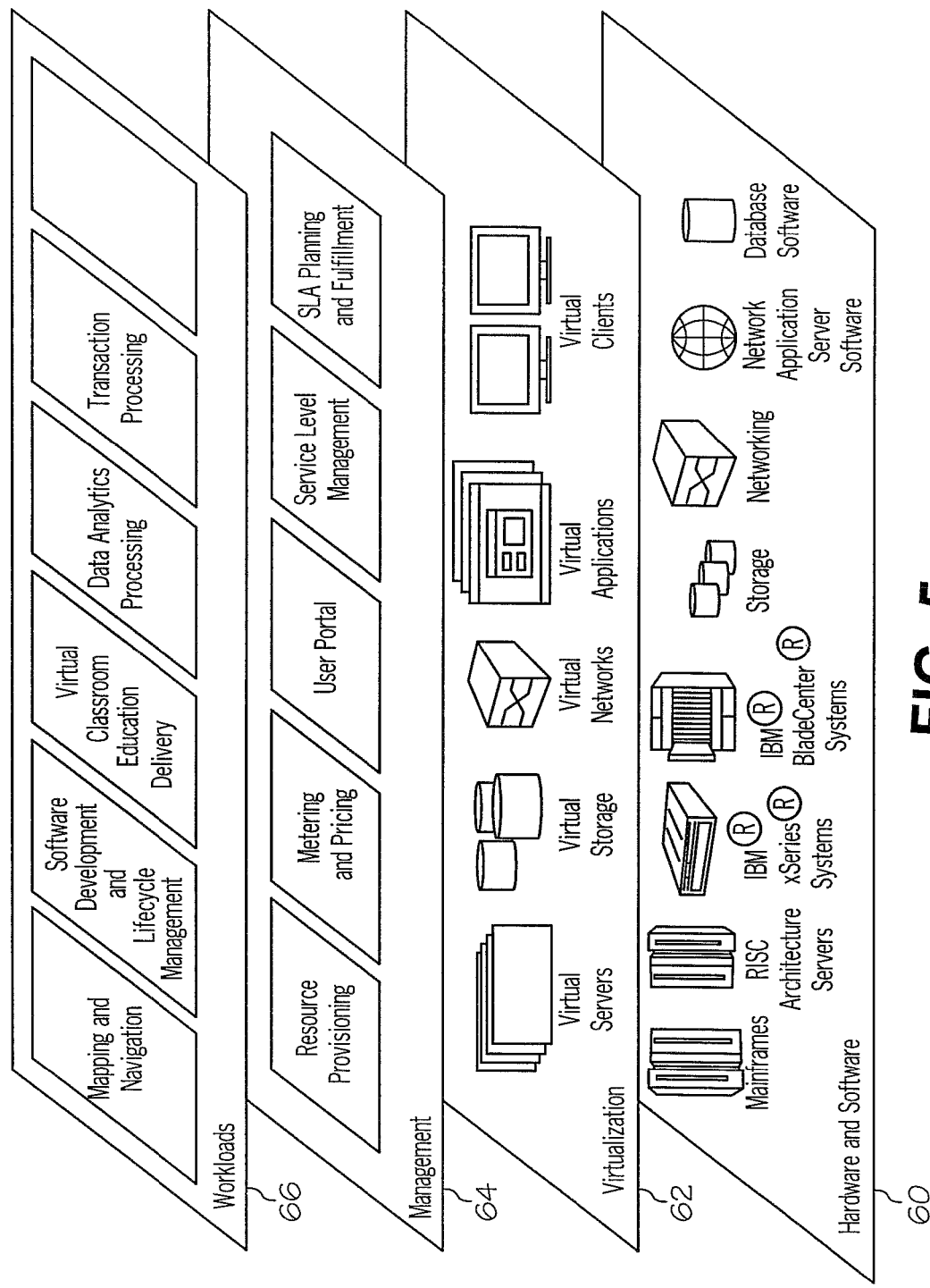
FIG. 5 depicts abstraction model layers, in accordance with some exemplary embodiments of the disclosed subject matter.

Referring now to FIG. 5, a set of functional abstraction layers provided by cloud computing environment 50 (FIG. 4) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, the method comprising:
    testing a computer program by operating the computer program by a computerized device, wherein the computerized device is operative to provide the computer program with access to a clock, wherein the clock is configured to provide a time while preserving a monotonically strict increasing property; wherein said testing comprises:
    intercepting at least a first access request and a second access request to the clock by the computer program, wherein said intercepting comprises:
        determining a first response and a second response to be provided to the computer program in response to the first access request and the second access request, respectively, wherein the first response and the second response is a time of the clock,
            wherein the first response is configured to simulate execution of the computer program on a first computerized device, and the second response is configured to simulate execution of the computer program on a second computerized device, wherein the second response is intentionally designed to be a response that would not have been returned in response to the second access request if the second access request was executed on the first computerized device, thus simulating migration of the computer program from the first computerized device to the second computerized device during execution,
        wherein said determining the second response comprises determining to violate a monotonically strict increasing property of a time function of the clock;
        in response to said determining to violate the monotonically strict increasing property of the time function:
            retrieving a previously provided time; and
            randomizing a time preceding the previously provided time within a predetermined range, wherein the randomized time is the second response; and
    providing the first response and the second response to the computer program instead of a first and second responses from the clock to the request.

2. The computer-implemented method of claim 1, further comprising receiving from a user the predetermined range.

3. The computer-implemented method of claim 1, wherein said determining comprises:
    retrieving a current time from the clock; and
    determining the time so as the time is after at least a predetermined time duration from the current time.

4. The computer-implemented method of claim 1, wherein said testing comprises testing validity of operation of the computer program in a cloud computing environment, wherein said testing is configured to test the validity of operation in response to migration between devices in the cloud computing environment.

5. The computer-implemented method of claim 4, further comprises, in response to completion of said testing validity of operation, loading the computer program onto the cloud computing environment.

6. The computer-implemented method of claim 1, further comprises pre-processing the computer program and identifying a function call operative to access the clock.

7. The computer-implemented method of claim 6, further comprising instrumenting the computer program with a code operative to replace the function call; and wherein said intercepting comprises executing the code.

8. A computerized apparatus, the apparatus comprising:
    a testing module operative to operate a computer program, wherein the testing module is configured to provide the computer program with access to a clock, wherein the clock is configured to provide a time while preserving a monotonically strict increasing property, wherein said testing module is operatively coupled to an interceptor;
    said interceptor operative to intercept at least a first access request and a second access request to the clock by the computer program, wherein
        said interceptor comprises a response determinator operative to determine a first response and a second response to be provided to the computer program in response to the first access request and the second access request, respectively, wherein the first response and the second response is a time of the clock, wherein the first response is configured to simulate execution of the computer program on a first computerized device, and the second response is configured to simulate execution of the computer program on a second computerized device, wherein the second response is intentionally designed to be a response that would not have been returned in response to the second access request if the second access request was executed on the first computerized device, thus simulating migration of the computer program from the first computerized device to the second computerized device during execution, wherein said determining the second response comprises determining to violate a monotonically strict increasing property of a time function of the clock;

in response to said determining to violate the monotonically strict increasing property of the time function:
retrieving a previously provided time; and
randomizing a time preceding the previously provided time within a predetermined range, wherein the randomized time is the second response; and wherein said interceptor is further operative to provide the first and second responses to the computer program instead of a first and second responses from the clock to the request; and a processor that is configured to be utilized by said testing module and said interceptor.

9. The computerized apparatus of claim 8, further comprising an input module operative to receive from a user the predetermined range.

10. The computerized apparatus of claim 8, wherein said response determinator is further operative to retrieve a current time from the clock; and determine the time so as the time is after at least a predetermined time duration from the current time.

11. The computerized apparatus of claim 8, wherein said testing module is configured to test validity of operation of the computer program in a cloud computing environment, wherein said testing is configured to test the validity of operation in response to migration between devices in the cloud computing environment.

12. The computerized apparatus of claim 8, further comprising an access identifier operative to pre-process the computer program and identify a function call operative to access the clock.

13. The computerized apparatus of claim 12, wherein pre-processing the computer program comprises instrumenting the computer program with code operative to replace the function call.

14. A computer program product comprising a non-transitory computer readable medium retaining program instructions, which instructions when read by a processor, cause the processor to perform a method comprising:

testing a computer program by operating the computer program by a computerized device, wherein the computerized device is operative to provide the computer program with access to a clock, wherein the clock is configured to provide a time while preserving a monotonically strict increasing property;

wherein said testing comprises:
intercepting at least a first access request and a second access request to the clock by the computer program, wherein said intercepting comprises:
determining a first response and a second response to be provided to the computer program in response to the first access request and the second access request, respectively, wherein the first response and the second response is a time of the clock,
wherein the first response is configured to simulate execution of the computer program on a first computerized device, and the second response is configured to simulate execution of the computer program on a second computerized device, wherein the second response is intentionally designed to be a response that would not have been returned in response to the second access request if the second access request was executed on the first computerized device, thus simulating migration of the computer program from the first computerized device to the second computerized device during execution, wherein said determining the second response comprises determining to violate a monotonically strict increasing property of a time function of the clock;

in response to said determining to violate the monotonically strict increasing property of the time function:
retrieving a previously provided time; and
randomizing a time preceding the previously provided time within a predetermined range, wherein the randomized time is the second response; and providing the first response and the second response to the computer program instead of a first and second responses from the clock to the request.

* * * * *